United States Patent [19]

Tsuji et al.

[11] Patent Number: 5,796,890
[45] Date of Patent: Aug. 18, 1998

[54] BIDIRECTIONAL OPTICALLY POWERED SIGNAL TRANSMISSION APPARATUS

[75] Inventors: Nobuhiko Tsuji, Kanagawa; Naoki Kaiho, Tokyo; Yasukazu Sano, Kanagawa, all of Japan

[73] Assignee: Fuji Electric Co., Ltd., Kawasaki, Japan

[21] Appl. No.: 652,639

[22] Filed: May 31, 1996

Related U.S. Application Data

[63] Continuation-in-part of Ser. No. 419,141, Apr. 10, 1995, Pat. No. 5,664,035.

[30] Foreign Application Priority Data

May 31, 1995 [JP] Japan ................. 7-133039

[51] Int. Cl.⁶ ............................................. G02B 6/293
[52] U.S. Cl. ......................... 385/24; 359/152; 359/171; 359/173
[58] Field of Search ................. 385/15, 24, 31, 385/33, 39; 359/113, 115, 124–127, 131, 152, 154, 171, 173; 250/227.21

[56] References Cited

U.S. PATENT DOCUMENTS

| | | | |
|---|---|---|---|
| 4,325,137 | 4/1982 | Yoshikazu | 359/171 |
| 4,596,051 | 6/1986 | Feldman | 359/152 |
| 4,727,535 | 2/1988 | Brandt | 359/113 |
| 4,973,169 | 11/1990 | Slonecker | 359/124 |
| 5,068,541 | 11/1991 | Kondo | 250/559.07 |
| 5,119,679 | 6/1992 | Frisch | 250/227.21 X |
| 5,223,707 | 6/1993 | Bjork | 250/227.21 |
| 5,664,035 | 9/1997 | Tsuji et al. | 385/24 |

OTHER PUBLICATIONS

G.R. Cucci, "Light Powered Systems, a Fiberoptic Interconnect Technology for Process Control", ISA—Paper #93–310, 1993, pp. 659–667. [No Month].

S. Henkel, "Single Optical Fiber Does It All for Smart Transmitters", Sensors, Jan. 1992, p. 8.

W. Gross, "Fiber–Optic Hybrid Sensors with Optical Power Supply", Siemens Forsch.–u. Entwickl.-Ber. Bd. 17, 1988, Nr. 1, pp. 13–17.

*Primary Examiner*—John D. Lee
*Attorney, Agent, or Firm*—Morrison Law Firm

[57] ABSTRACT

A bidirectional optically powered signal transmission apparatus includes a control station and a field station which are optically linked by an optical fiber for signal transmission and for power transmission. The control station sends a first light beam to a light receiver in the field station. The field station sends a second light beam to the control station. The first and second light beams are at different wavelengths so that simultaneous bidirectional transmission is enabled. The field station further converts a portion of the first light beam to electric power for powering the field station. The field station demodulates an AC component superimposed on the light it receives to produce an AC electric signal for control of the field station. The control and field stations include respective optical transceiver circuits, each including a light source, light receiver and light splitter-coupler. The light receiver in the control station further includes a light receiver array for converting a portion of the first light beam to electric power.

20 Claims, 9 Drawing Sheets

BIDIRECTIONAL OPTICALLY POWERED SIGNAL TRANSMISSION APPARATUS

This is a continuation-in-part of application Ser. No. 08/419,141 filed Apr. 10, 1995 (now U.S. Pat. No. 5,664,035).

BACKGROUND OF THE INVENTION

The present invention relates to an optically powered signal transmission apparatus which communicates bidirectionally between two stations, with electric power supplied from one to the other through a light beam.

Many optical transmission systems are known which transmit data through an optical fiber cable transmission network between two or more stations. Such systems offer enhanced data security, immunity to electromagnetic noise (EMI and RFI) and excellent explosion-proof properties. This latter feature makes such systems ideally suited for operating in potentially explosive atmospheres.

Figure 11:
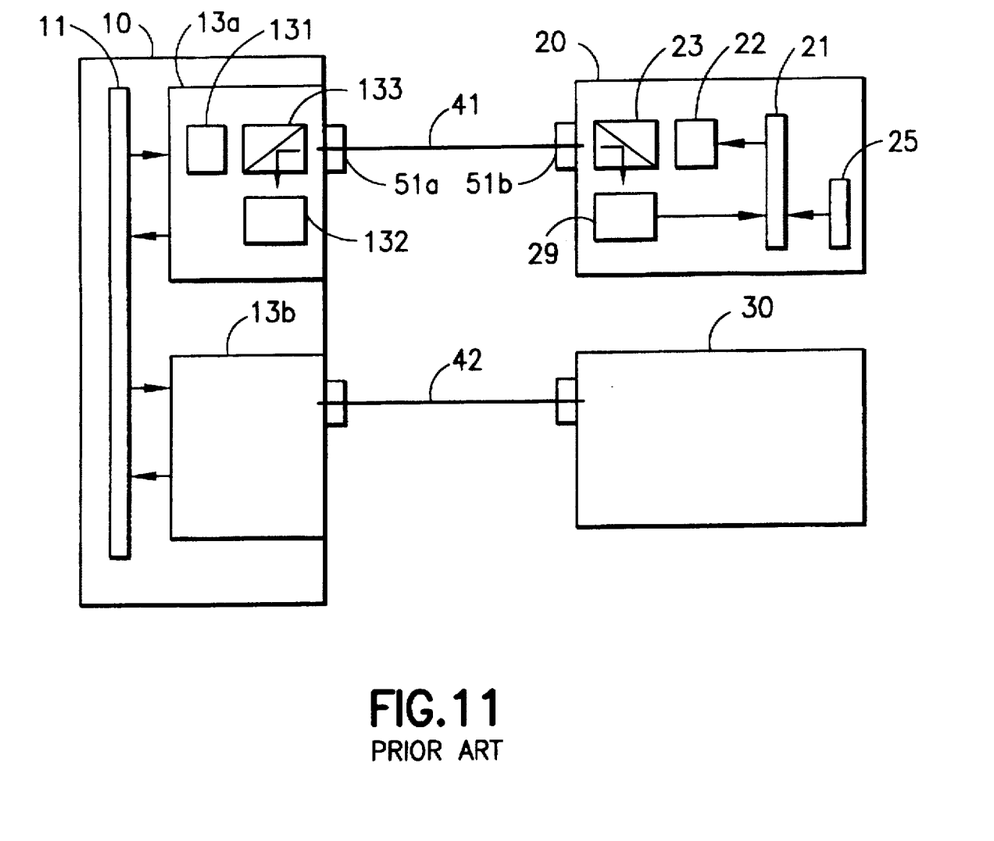
FIG. 11 shows a block diagram of a conventional optical signal transmission apparatus according to the prior art.

Referring to FIG. 11, a block diagram of a conventional optical signal transmission apparatus according to the prior art is shown. A control station 10 controls two field stations 20 and 30. Field station 20 typically contains transducers and works as a sensor which measures temperature, pressure, etc. or works as an actuator which adjusts temperature, pressure, etc. Control station 10 includes an optical transceiver circuit 13a for use with field station 20. Control station 10 also includes an optical transceiver circuit 13b for use with field station 30. Field station 30 is identical to field station 20. Optical transceiver circuit 13b is identical to optical transceiver circuit 13a. The descriptions of field station 30 and optical transceiver circuit 13b are therefore omitted.

Optical transceiver circuit 13a includes a light source 131 for producing a light beam. The light beam passes through an optical light splitter-coupler 133 and an optical fiber 41 to field station 20. In field station 20, the light beam enters a light splitter-coupler 23 where it is reflected to a light receiver 29. Light receiver 29 converts the optical signal to an electric signal which is sent to a control circuit 21. Control circuit 21 is an interface with any type of transducer (not shown) or sensor (not shown) that are in field station 20. Control circuit 21 detects control data in the electric signal. Control circuit 21 controls a light source 22 for producing an outgoing beam which passes through light splitter-coupler 23 and optical fiber 41. The light beam is reflected by optical light splitter-coupler 133 to a light receiver 132. Light receiver 132 converts the optical signal to an electric signal which is sent to a control circuit 11. Control circuit 11 detects data produced by field station 20. Optical fiber 41 is connected to control station 10 by a connector 51a and to field station 20 by a connector 51b. A battery 25 powers field station 20.

Field stations 20, 30 are assumed to be placed in adverse environments, such as, for example, in dangerous areas in an oil refinery or chemical factory, in which a potentially explosive atmosphere exists. Because of this, battery 25 is used for avoiding high voltages. Battery 25 must be explosion proof or meet intrinsic safety conditions.

Additionally, battery 25 must be replaced on a regular basis. Care must be taken in designing and locating field station 20 to facilitate battery replacement. The conventional optical signal transmission system is therefore subject to high material and labor costs for replacing batteries.

For these reasons, optically powered signal transmission systems have been developed which eliminate the need for a battery. Solar cells are used to convert light, transmitted through a power optical fiber, to electric power to power the field station. The return signal from the field station is normally carried over a separate signal optical fiber. This requires two optical fibers; the power optical fiber and the signal optical fiber.

Sensor systems are being developed which use one optical fiber for both power and signal. A power light beam is sent from a control station to a remote sensor over an optical fiber where part of the light is converted to electricity to power the sensor. The remainder of the light beam, after being modulated with a digital signal produced by the sensor output, returns to the control station via the same optical fiber. The amount of light converted to electric power is quite limited. In addition, optical fiber lengths are limited due to the necessity for the optical signal to return to the control station without undue attenuation. Another drawback to such systems is that the signal communication is one-way, from the sensor to the control station. Bidirectional communications requires either a battery at the field station or two cables, one for the power and one for the signal.

OBJECTS AND SUMMARY OF THE INVENTION

In view of the foregoing, an object of the present invention is to provide an optically powered signal transmission apparatus which overcomes the drawbacks and limitations of the prior art.

Another object of the present invention is to provide an optically powered signal transmission apparatus which provides both power and signal from a control station to a field station over an optical fiber.

Another object of the present invention is to provide an optically powered signal transmission apparatus which communicates bidirectionally between stations without requiring a power source at both of the stations.

Another object of the present invention is to provide an optically powered signal transmission apparatus which communicates bidirectionally over a much longer distance than the conventional bidirectional optically powered signal transmission apparatus.

A further object of the present invention is to provide an optically powered bidirectional signal transmission apparatus between a control station and a field station which eliminates a battery from the field station and reduces maintenance costs.

A still further object of the present invention is to provide a bidirectional optically powered signal transmission apparatus which prevents long term exposure of human eyes and skin to power light.

Briefly stated, a bidirectional optically powered signal transmission apparatus includes a control station and a field station which are optically linked by an optical fiber for signal transmission and for power transmission. The control station sends a first light beam to a light receiver in the field station. The field station sends a second light beam to the control station. The first and second light beams are at different wavelengths so that simultaneous bidirectional transmission is enabled. The field station further converts a portion of the first light beam to electric power for powering the field station. The field station demodulates an AC component superimposed on the light it receives to produce an AC electric signal for control of the field station. The control and field stations include respective optical transceiver circuits, each including a light source, light receiver and light splitter-coupler. The light receiver in the control station further includes a light receiver array for converting a portion of the first light beam to electric power.

According to an embodiment of the invention, there is provided a bidirectional optically powered signal transmission apparatus which includes first and second optical transmission stations, first means, in the first optical transmission station, for sending a first light beam over a first optical transmission path to the second optical transmission station, second means, in the first optical transmission station, for receiving a second light beam sent over the first optical transmission path from the second optical transmission station, third means, in the second optical transmission station, for sending the second light beam to the first optical transmission station over the first optical transmission path, fourth means, in the second optical transmission station, for receiving the first light beam sent from the first optical transmission station, fifth means, in the first optical transmission station, for sending a power light beam to the second optical transmission station over a second optical transmission path, sixth means, in the second optical transmission station, for receiving the power light beam sent from the first optical transmission station and for converting the power light beam to electric power for powering the second optical transmission station, and the first and second light beams having different wavelengths.

According to an embodiment of the invention, there is provided a bidirectional optically powered signal transmission apparatus which includes first and second optical transmission stations, first means, in the first optical transmission station, for sending a first light beam over an optical transmission path to the second optical transmission station, second means, in the first optical transmission station, for receiving a second light beam sent from the second optical transmission station, the first light beam including an AC signal component superimposed on a DC power component, third means, in the second optical transmission station, for sending the second light beam to the first optical transmission station over the optical transmission path, fourth means, in the second optical transmission station, for receiving the first light beam sent from the first optical transmission station, fifth means, in the second optical transmission station, for converting the DC power component to an electric power for powering the second optical transmission station and for converting the AC signal component to a first electric signal for controlling the second optical transmission station, the first means including first light source means for radiating the first light beam of a first predetermined wavelength, and driving means for regulating the AC component, the third means including second light source means for radiating the second light beam of a second predetermined wavelength, and the second predetermined wavelength being different from the first predetermined wavelength.

According to an embodiment of the invention, there is provided a bidirectional optically powered signal transmission apparatus which includes first and second optical transmission stations, first means, in the first optical transmission station, for sending a first light beam on an optical transmission path to the second optical transmission station, second means, in the first optical transmission station, for receiving a second light beam sent from the second optical transmission station, the first light beam including a signal light and a power light, third means, in the second optical transmission station, for sending the second light beam to the first optical transmission station over the optical transmission path, fourth means, in the second optical transmission station, for receiving the first light beam sent from the first optical transmission station, fifth means, in the second optical transmission station, for converting the power light to an electric power for powering the second optical transmission station and for converting the signal light to a first electric signal for controlling the second optical transmission station, the first means including first light source means for radiating the first light beam of a first predetermined wavelength and driving means for modulating an intensity of the power light at a first predetermined period and for modulating an intensity of the signal light at a second predetermined period, the second predetermined period being shorter than the first predetermined period, the third means including second light source means for radiating the second light beam of a second predetermined wavelength, and the second predetermined wavelength being different from the first predetermined wavelength.

According to an embodiment of the invention, there is provided a bidirectional optically powered signal transmission apparatus which includes a control station, a field station, means in the control station for sending a first light beam of a first predetermined wavelength on an optical transmission path to the field station, the first light beam including an AC signal light component and a DC power light component, an intensity of the DC power light component being modulated at a first predetermined period and an intensity of the AC signal light component being modulated at a second predetermined period, the second predetermined period being shorter than the first predetermined period, means in the control station for receiving a second light beam sent from the field station, means in the field station for sending the second light beam at a second predetermined wavelength to the control station over the optical transmission path, means in the field station for receiving the AC signal light component and the DC power light component sent from the control station, means in the field station for converting the DC power light component to an electric power for powering the field station and for converting the AC signal light component to a control signal for controlling the field station, and the second predetermined wavelength being different from the first predetermined wavelength.

According to an aspect of the present invention, there is provided a bidirectional optically powered signal transmission apparatus which includes first and second optical transmission stations, first means, in the first optical transmission station, for sending a first signal light beam over a first optical transmission path to the second optical transmission station, and for receiving a second signal light beam sent over the first optical transmission path from the second optical transmission station, second means, in the second optical transmission station, for sending the second signal light beam to the first optical transmission station over the first optical transmission path, and for receiving the first signal light beam sent from the first optical transmission station, third means, in the first optical transmission station, for sending a power light beam to the second optical transmission station over a second optical transmission path, fourth means, in the second optical transmission station, for receiving the power light beam sent from the first optical transmission station and for converting the power light beam to electric power for powering the second optical transmission station, and the first and second signal light beams having different wavelengths.

According to another aspect of the present invention, there is provided a bidirectional optically powered signal transmission apparatus which includes first and second optical transmission stations, first means, in the first optical transmission station, for sending a first light beam over an optical transmission path to the second optical transmission station, and for receiving a second light beam sent from the second optical transmission station, the first light beam including an AC signal component and a DC power component, second means, in the second optical transmission station, for sending the second light beam to the first optical transmission station over the optical transmission path, and for receiving the first light beam sent from the first optical transmission station, means, in the second optical transmission station, for converting the DC power component to electric power for powering the second optical transmission station and for converting the AC signal component to a first electric signal for controlling the second optical transmission station, the first means including first light source means for radiating the first light beam of a first predetermined wavelength, and driving means for regulating the AC component, the second means including second light source means for radiating the second light beam of a second predetermined wavelength, and the second predetermined wavelength being different from the first predetermined wavelength.

According to a feature of the present invention, the means for converting includes a first opto-electric converter for converting the DC power component to the electric power, the first opto-electric converter including a plurality of light receivers arranged in an array, and a second opto-electric converter for converting the AC power component to the first electric signal, the second opto-electric converter including a light receiver.

According to a feature of the present invention, the light receivers of the first opto-electric converter and the light receiver of the second opto-electric converter are integrally formed as a compound semiconductor light receiver film.

According to a feature of the present invention, the first means includes a first light splitter-coupler for reflecting the second light beam sent from the second optical transmission station, and a first light receiver for converting the second light beam reflected from the first light splitter-coupler to a second electric signal.

According to a feature of the present invention, the first light splitter-coupler includes a first positive lens for coupling the first light beam to the optical transmission path, a wavelength selection filter, and the wavelength selection filter being selective for the second predetermined wavelength.

According to a feature of the present invention, the second means includes a second light splitter-coupler for directing the first light beam sent from the first optical transmission station to the means for converting.

According to a feature of the present invention, the second light splitter-coupler includes a second positive lens for coupling the second light beam to the optical transmission path, a wavelength selection filter, and the wavelength selection filter being selective for the first predetermined wavelength.

According to a feature of the present invention, the bidirectional optically powered signal transmission apparatus further includes means for sending a command signal to the second optical transmission station, means for monitoring a time from the sending of the command signal to arrival of a response signal from the first optical transmission station, and means for stopping sending of the first light beam from the first optical transmission station when a predetermined time period has elapsed before the arrival of the response signal.

According to a further aspect of the present invention, there is provided a bidirectional optically powered signal transmission apparatus which comprises: first and second optical transmission stations, first means, in the first optical transmission station, for sending a first light beam on an optical transmission path to the second optical transmission station, and for receiving a second light beam sent from the second optical transmission station, the first light beam including a signal light and a power light, second means, in the second optical transmission station, for sending the second light beam to the first optical transmission station over the optical transmission path, and for receiving the first light beam sent from the first optical transmission station, means, in the second optical transmission station, for converting the power light to electric power for powering the second optical transmission station and for converting the signal light to a first electric signal for controlling the second optical transmission station, the first means including first light source means for radiating the first light beam of a first predetermined wavelength, and driving means for modulating the power light's intensity at a first predetermined period and for modulating the power signal light's intensity at a second predetermined period, the second predetermined period being shorter than the first predetermined period, the second means including second light source means for radiating the second light beam of a second predetermined wavelength, and the second predetermined wavelength being different from the first predetermined wavelength.

According to a further feature of the present invention, the means for converting includes a first opto-electric converter for converting the power light from the first optical transmission station to the electric power and a second opto-electric converter for converting the signal light from the first optical transmission station to the first electric signal.

According to a further feature of the present invention, the means for converting further includes a transformer for boosting the first opto-electric converter's output voltage, and a rectifier for converting the transformer's AC output to a DC electric power.

According to a further feature of the present invention, the first opto-electric converter's photosensitive area is wider than the second opto-electric converter's photosensitive area.

According to a further feature of the present invention, the first opto-electric converter and the second opto-electric converter are integrally formed as a compound semiconductor opto-electric converter film.

According to a further feature of the present invention, the first means includes a first light splitter-coupler for reflecting the second light beam sent from the second optical transmission station, and a first light receiver for converting the second light beam reflected from the first light splitter-coupler to a second electric signal.

According to a further feature of the present invention, the first light splitter-coupler includes a first positive lens for coupling the first light beam to the optical transmission path, a wavelength selection filter, and the wavelength selection filter being selective for the second predetermined wavelength.

According to a further feature of the present invention, the second means includes a second light splitter-coupler for directing the first light beam sent from the first optical transmission station to the means for converting.

According to a still further feature of the present invention, the second light splitter-coupler includes a second positive lens for coupling the second light beam to the optical transmission path, a wavelength selection filter, and the wavelength selection filter being selective for the first predetermined wavelength.

According to a still further feature of the present invention, the bidirectional optically powered signal transmission apparatus further includes means for sending a command signal to the second optical transmission station, means for monitoring a time from the sending the command signal to arrival of a response signal to the first optical transmission station, and means for stopping sending of the power light from the first optical transmission station when a predetermined time period has elapsed before the arrival of the response signal.

Power light is transmitted over a power optical fiber to the field station or over a common optical fiber through which the first and second light beams are transmitted bidirectionally. In the latter case, the first light beam contains a signal light component and a power light component. The field station converts the power light sent over a separate power optical fiber or the power light component contained in the first light beam sent over the common optical fiber to electric power for powering the field station. The power light component is a DC component on which a signal light AC component is super imposed or a component whose intensity is modulated at a much longer period than the modulation period of the signal light intensity. Signal light and power light receiving functions in field station are preferably integrated into an integrated opto-electric converter.

The battery is eliminated from the bidirectional optical transmission system by optically powering the field station with light supplied from the control station. Thus, the present invention reduces maintenance costs of an optical bidirectional transmission system and facilitates bidirectional communication through the optical fiber between two optical transmission stations.

By providing the control and field stations with respective light sources for emitting signal light beams, the signal transmission length, or, the distance between the control and field stations, is more than twice as long as that of the conventional bidirectional signal transmission apparatus.

The control station monitors the response time of the field station and stops feeding power light when the response time exceeds a predetermined time. Thus, power consumption in the control station is reduced. Also, human eyes and skin are protected from long time exposure to power light.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
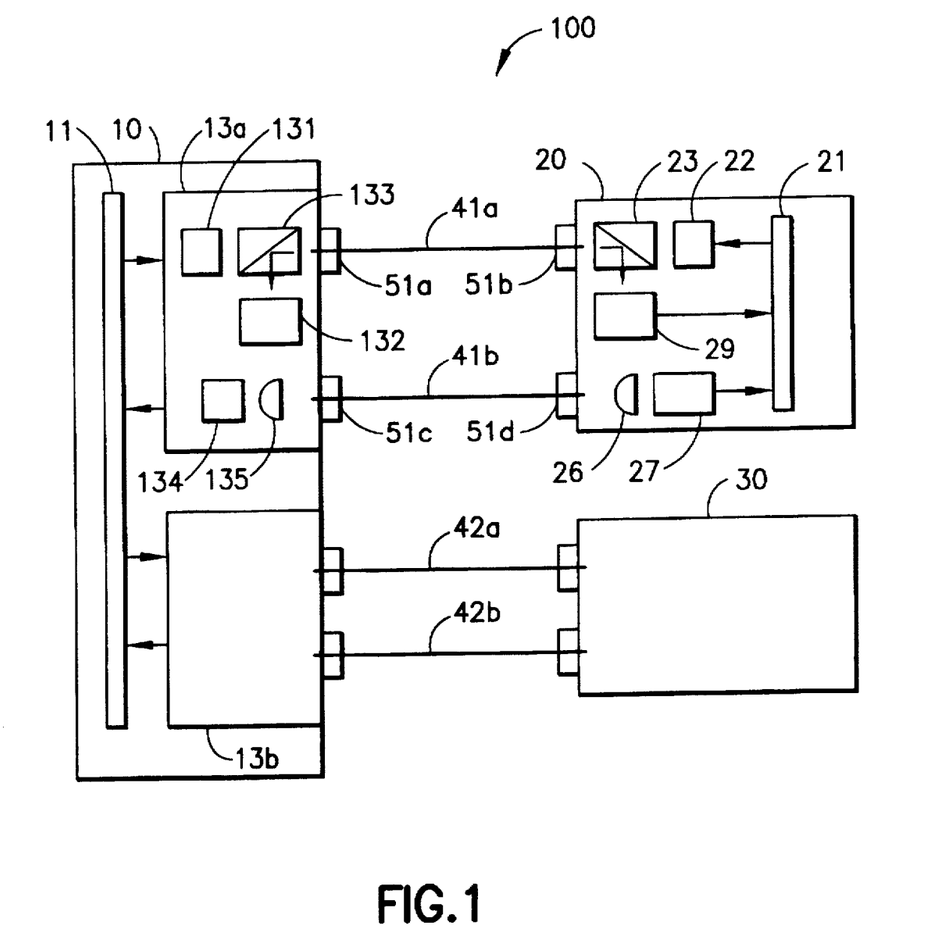
FIG. 1 shows a block diagram of an optically powered signal transmission apparatus according to a first embodiment of the present invention.

Referring to FIG. 1, an optically powered signal transmission apparatus, shown generally at 100, includes a control station 10 as an optically power supplying side, and a field station 20 as an optically powered side. Since a field station 30 is the same as field station 20, further description of field station 30 is omitted. An optical transceiver circuit 13a in control station 10 transmits and receives signal light to and from field station 20. Optical transceiver circuit 13a is controlled by a control circuit 11. Control station 10 and field station 20 are connected by optical fibers 41a and 41b. Optical fibers 41a, 41b are affixed to control station 10 by connectors 51a, 51c and to field station 20 by connectors 51b, 51d. Control station 10 and field station 30 are connected by optical fibers 42a and 42b.

Optical transceiver circuit 13a includes a light source 131 for producing a signal light beam. The signal light beam passes through an optical light splitter-coupler 133 and optical fiber 41a to field station 20. In field station 20, the signal light beam enters a light splitter-coupler 23 where it is reflected to a light receiver 29. Light receiver 29 converts the optical signal to an electric signal which is sent to a control circuit 21. Control circuit 21 is an interface with any type of transducer (not shown) or sensor (not shown) that are in field station 20. Control circuit 21 detects control data in the electric signal. Control circuit 21 controls a light source 22 for producing an outgoing beam which passes through light splitter-coupler 23 and optical fiber 41a. The signal light beam is reflected by optical light splitter-coupler 133 to a light receiver 132. Light receiver 132 converts the optical signal to an electric signal which is sent to control circuit 11. Control circuit 11 detects data produced by field station 20 from the converted electric signal.

Optical transceiver circuit 13a also includes a light source 134 for producing a power light beam. The power light beam is converged by a lens 135 and coupled to optical fiber 41b. In field station 20, the power light beam is distributed by a lens 26 over a light receiver array 27, where it is converted to electric power.

Figure 2:
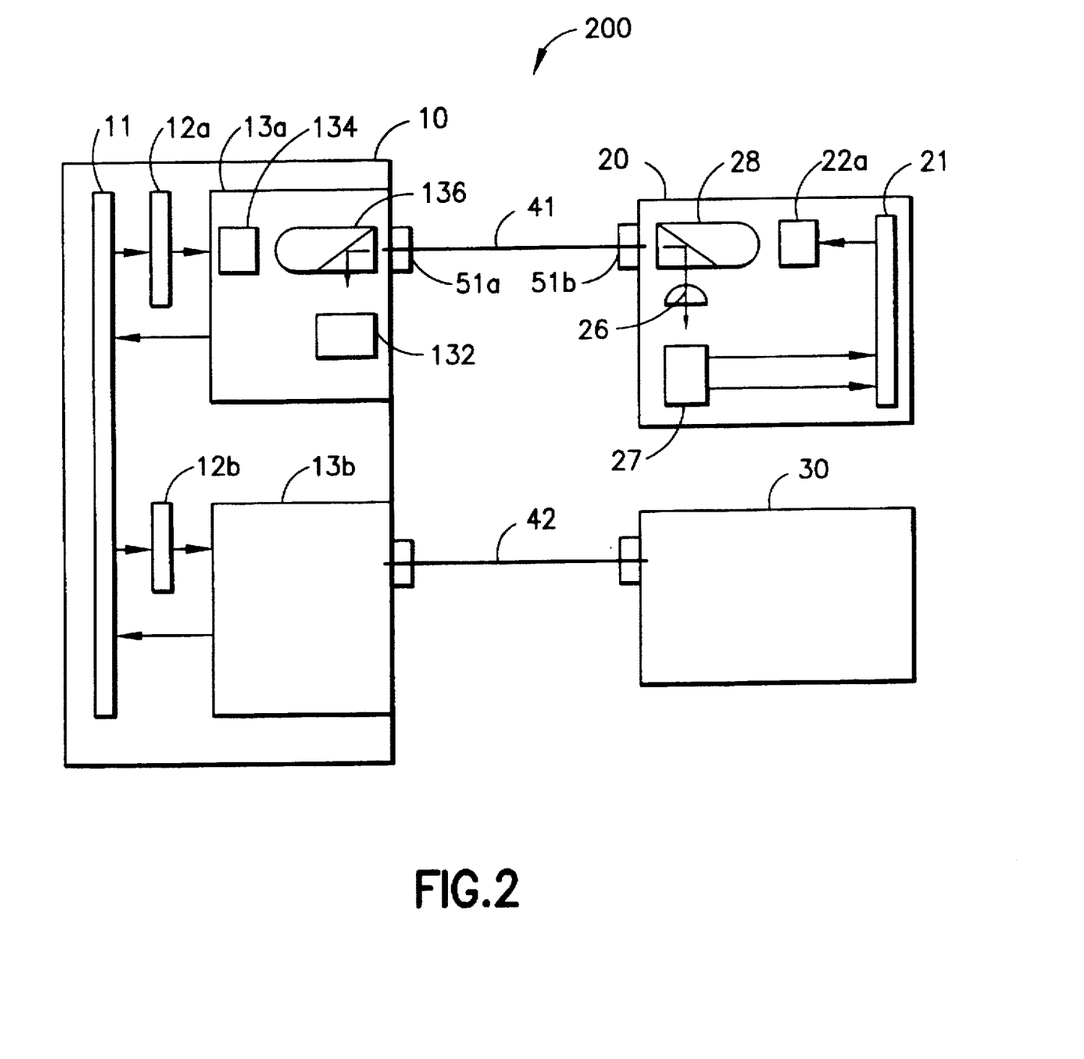
FIG. 2 shows a block diagram of an optically powered signal transmission apparatus according to a second embodiment of the present invention.

Referring to FIG. 2, an optically powered signal transmission apparatus, shown generally at 200, includes control station 10 as the optically power supplying side, and field station 20 as the optically powered side. In the second embodiment, control station 10 and field station 20 are connected by an optical fiber 41. Optical fiber 41 is affixed to control station 10 by connector 51a, and to field station 20 by connector 51b. Control station 10 and field station 30 are connected by an optical fiber 42. Since field station 30 is the same as field station 20, further description of field station 30 is omitted.

Optical transceiver circuit 13a of this embodiment includes light source 134 which sends a light beam consisting of both signal light and power light to field station 20. Hereinafter, "combined light" or "combined light beam" refer to the combined signal light and power light emitted by light source 134 and such light sources. The combined light beam is converged and filtered through a light splitter-coupler 136.

Figure 3:
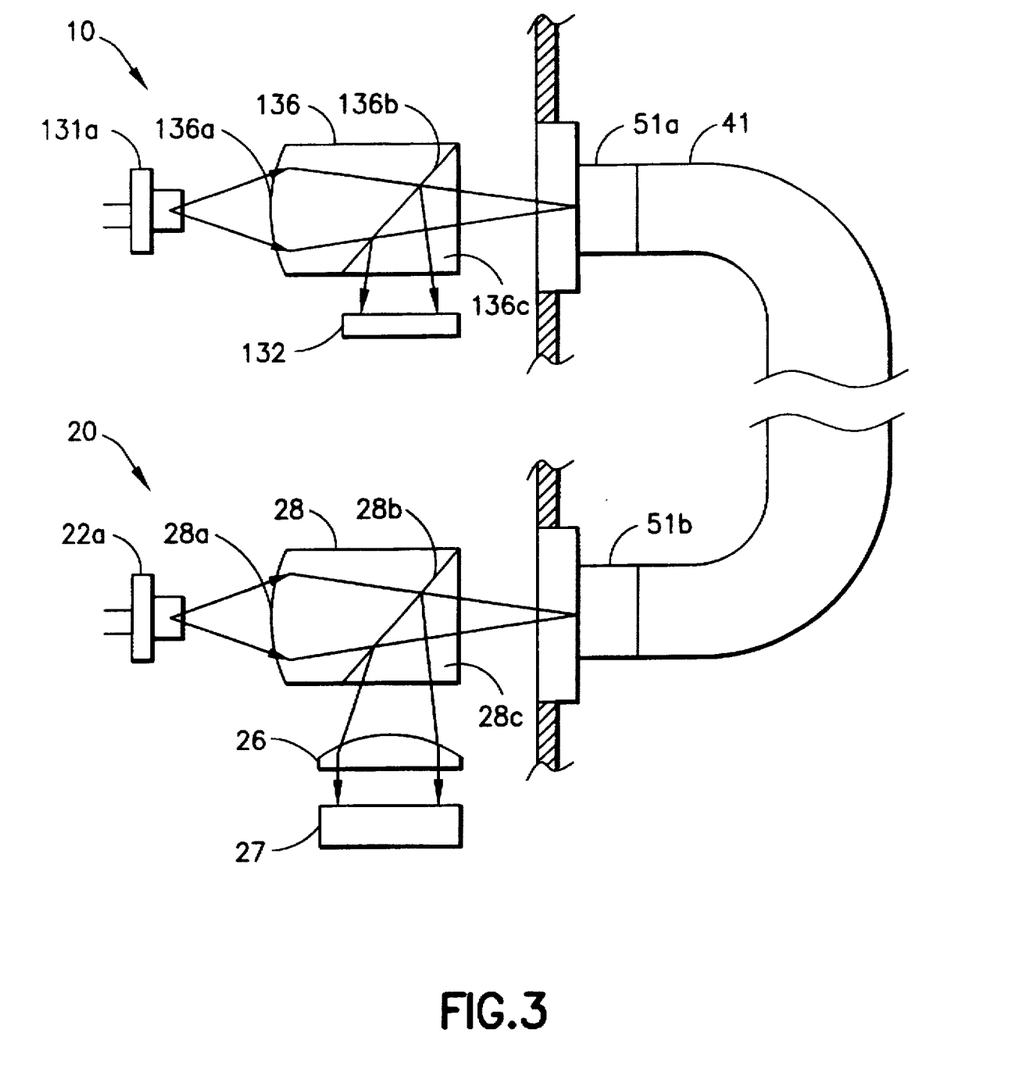
FIG. 3 shows light splitter-couplers in relation to the other relevant optical elements according to the second embodiment of the present invention.

Referring to FIG. 3, light splitter-coupler 136 and a light splitter-coupler 28 are shown in relation to the other relevant optical elements. Control station 10 includes a light source 131a. Light splitter-coupler 136 includes a positive lens 136a and a wavelength selection filter film 136b. Alternatively, an optical beam splitter with no wavelength dependence, such as a partially reflecting mirror, may be used for light splitter-coupler 136. The function of positive lens 136a is then performed by a separate refracting or reflecting element (not shown). Light splitter-coupler 136 is coupled to optical fiber 41 via connector 51a, from which the combined light beam is transmitted to field station 20.

Field station 20 includes a light source 22a, light splitter-coupler 28, lens 26, light receiver array 27 and control circuit 21. Control circuit 21 controls reception and sending of signals.

Figure 5:
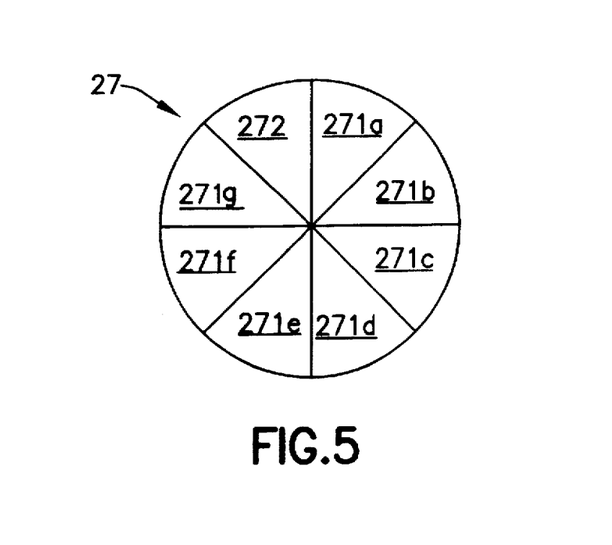
FIG. 5 shows a front view of a light receiver array according to the second embodiment of the present invention.

Referring momentarily to FIG. 5, a front view of light receiver array 27 is shown. A light receiver 272 converts the signal light from control station 10 to an electric signal. An array of seven light receivers 271a, 271b, 271c, 271d, 271e, 271f, 271g converts the power light to an electrical quantity. Light receiver array 27 unitarily integrates light receivers 272 and 271a, 271b, 271c, 271d, 271e, 271f, 271g.

Referring again to FIG. 2, light source 134 is any conventional light source, such as a light emitting diode or a semiconductor laser diode which preferably has a center emission wavelength suitable for low loss transmission through optical fiber 41 such as, for example, about 780 nm. Light source 134 sends the signal light and the power light to field station 20 as a combined light.

Figure 4:
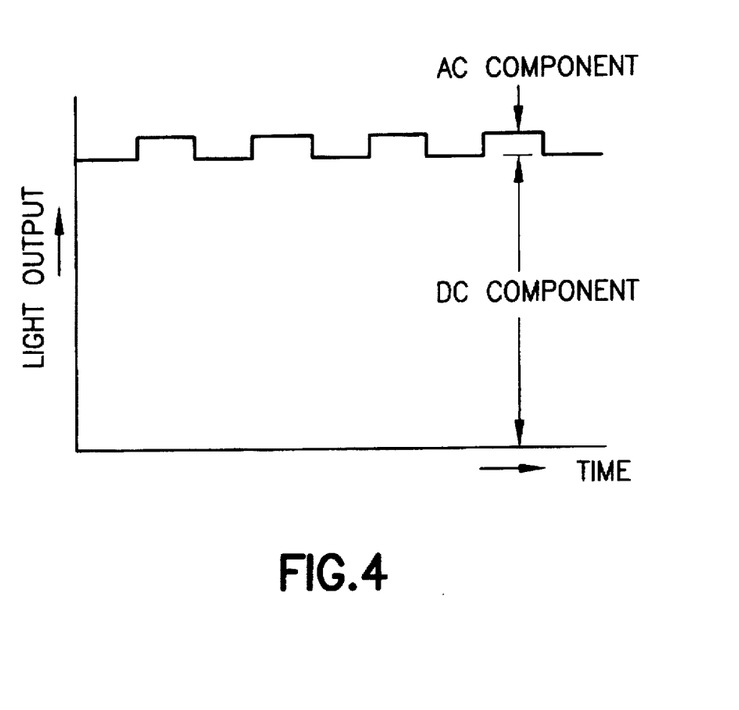
FIG. 4 shows a curve representing amplitude of the combined light sent from a control station to a field station according to the second embodiment of the present invention.

Referring to FIG. 4, a curve representing amplitude of the combined light sent from control station 10 to field station 20 is shown. A DC component is the predominant output emitted from light source 134. The DC component is used for optical power transmission. An AC signal component is superimposed on the DC power component. The AC component contains the data. A driver circuit 12a (as shown in FIG. 2) drives light source 134 with a current effective to superimpose the AC signal component on the DC power component. A driver circuit 12b, is also provided.

Referring again to FIGS. 2 and 3, the combined light emitted from light source 134 is converged and filtered through light splitter-coupler 136. The filtered combined light is then transmitted over optical fiber 41 through connectors 51a, 51b to field station 20. An optically transparent element 136c has the same refractive index as positive lens 136a to prevent total reflection from occurring on optical wavelength selection filter film 136b.

Light splitter-coupler 28 in field station 20 includes a positive lens 28a, an optical wavelength selection filter film 28b and an optically transparent element 28c, all similar to those of counterpart light splitter-coupler 136 in control station 10. In field station 20, optical wavelength selection filter film 28b deflects (reflects) the combined light. Lens 26 distributes the deflected combined light over light receiver array 27.

Figure 6:
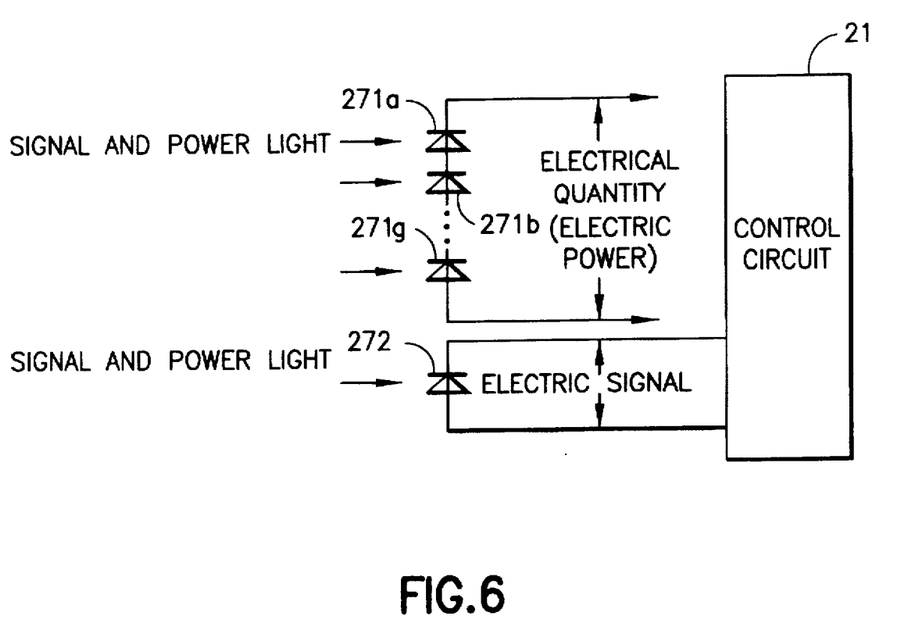
FIG. 6 shows a circuit diagram of a light receiver array according to the second embodiment of the present invention.

Referring to FIG. 6, light receiver 272 converts the signal light component (AC component) of the combined light to an electric signal. Light receivers 271a, 271b, 271c, 271d, 271e, 271f, 271g convert the power light component (DC component) to an electric power. The electric signal is sent to control circuit 21 as the control data from control station 10. The electric power powers a light source 22a, control circuit 21 and other devices in field station 20.

Field station 20 transmits signal light to control station 10 as follows. Light source 22a is preferably a light emitting diode or a semiconductor laser diode, preferably having a center emission wavelength that is different from the center emission wavelength of light source 134. The center emission wavelength of light source 22a is preferably about 850 nm. The difference between the center emission wavelengths enables simultaneous bidirectional transfer of optical data transmission on a common optical fiber.

Field station 20 sends signal light from light source 22a to light splitter-coupler 28, where it is converged and coupled to optical fiber 41 for transmission to control station 10. In control station 10, the transmitted signal light is relayed through connector 51a and reflected from optical wavelength selection filter film 136b of light splitter-coupler 136 onto light receiver 132. Light receiver 132 converts the signal light to an electric signal which is sent to control station 10. Control station 10 detects the data measured by field station 20 such as temperature, pressure, etc. from the electric signal.

Referring again to FIG. 5, light receiver array 27 is divided into eight equal light receivers. When a quick response to signal light is required, light receiver 272 is formed as small as possible. Multiple light receivers 271a, 271b, 271c, 271d, 271e, 271f, 271g are used to generate a minimum voltage necessary to drive all the circuits in field station 20. Light receivers 271a, 271b, 271c, 271d, 271e, 271f, 271g are preferably connected in series. Then, the number of light receivers 271a, 271b, 271c, 271d, 271e, 271f, 271g is determined such that the number of light receivers is greater than or equal to the voltage necessary to drive all the circuits divided by the output voltage of each light receiver. The geometric arrangement of light receiver array 27 can be varied to take advantage of the focusing characteristics of light splitter-coupler 28 and lens 26.

Light receiver 272 may include, for example, compound semiconductor thin film containing gallium arsenide (GaAs), silicon (Si), etc. It is preferable to use gallium arsenide thin film which exhibits a higher rate of energy conversion at thinner film thickness than silicon (See T. Imai, "Compound Semiconductor Device", Kogyou Chosakai Publishing Co. Ltd., 1985, pp. 314–315).

Figure 7:
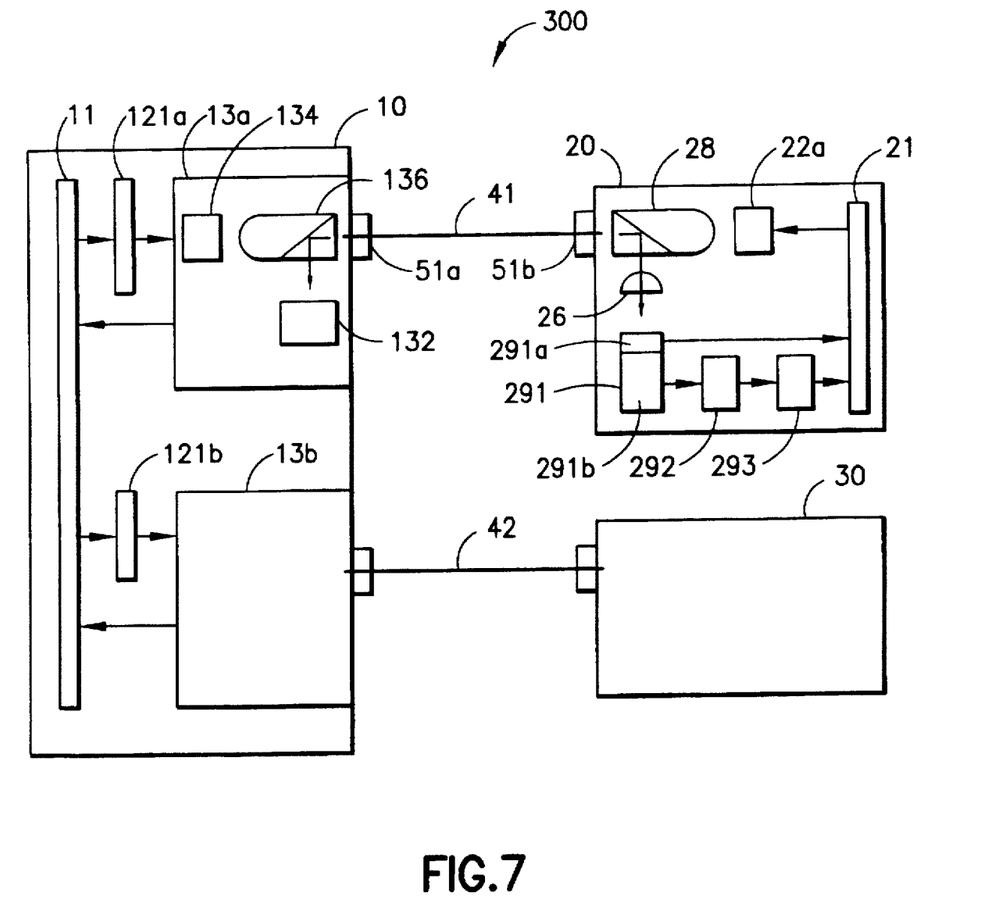
FIG. 7 shows a block diagram of an optically powered signal transmission apparatus according to a third embodiment of the present invention.
Figure 8:
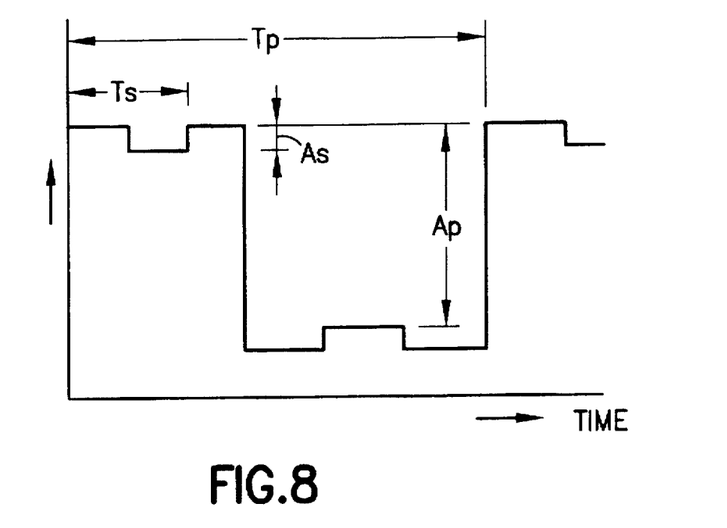
FIG. 8 shows a curve representing the amplitude of combined light sent from a control station to a field station according to the third embodiment of the present invention.

Referring to FIG. 7, an optically powered signal transmission apparatus, shown generally at 300, includes control station 10. In control station 10, a driver circuit 121a drives light source 134 to combine power light, whose intensity is modulated (amplitude: $A_p$) at a certain period $T_p$, and signal light, whose intensity is modulated (amplitude: $A_s$) at a period $T_s$ much shorter than $T_p$ (as shown in FIG. 8). A driver circuit 121b is also shown.

Figure 9:
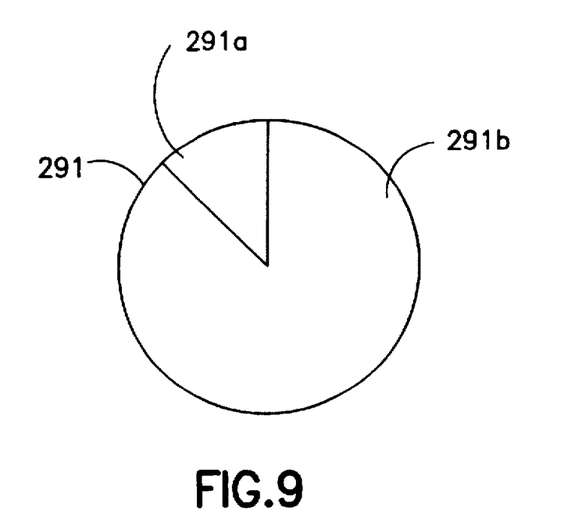
FIG. 9 shows a front view of a light receiver array according to the third embodiment of the present invention.

In field station 20, a light receiver array 291 converts the signal light to an electric signal and the power light to electric power. Light receiver array 291 includes a light receiver 291a having a relatively small area and a light receiver 291b having a relatively large area (as shown in FIG. 9). The electric signal from light receiver 291a is sent to control circuit 21. The electric power (AC) from light receiver 291b is sent to a transformer 292, where it is boosted to a voltage high enough to drive control circuit 21 and other circuits in field station 20. A rectifier 293 rectifies the AC electric power to produce DC electric power, which is then supplied to control circuit 21.

Figure 10A:
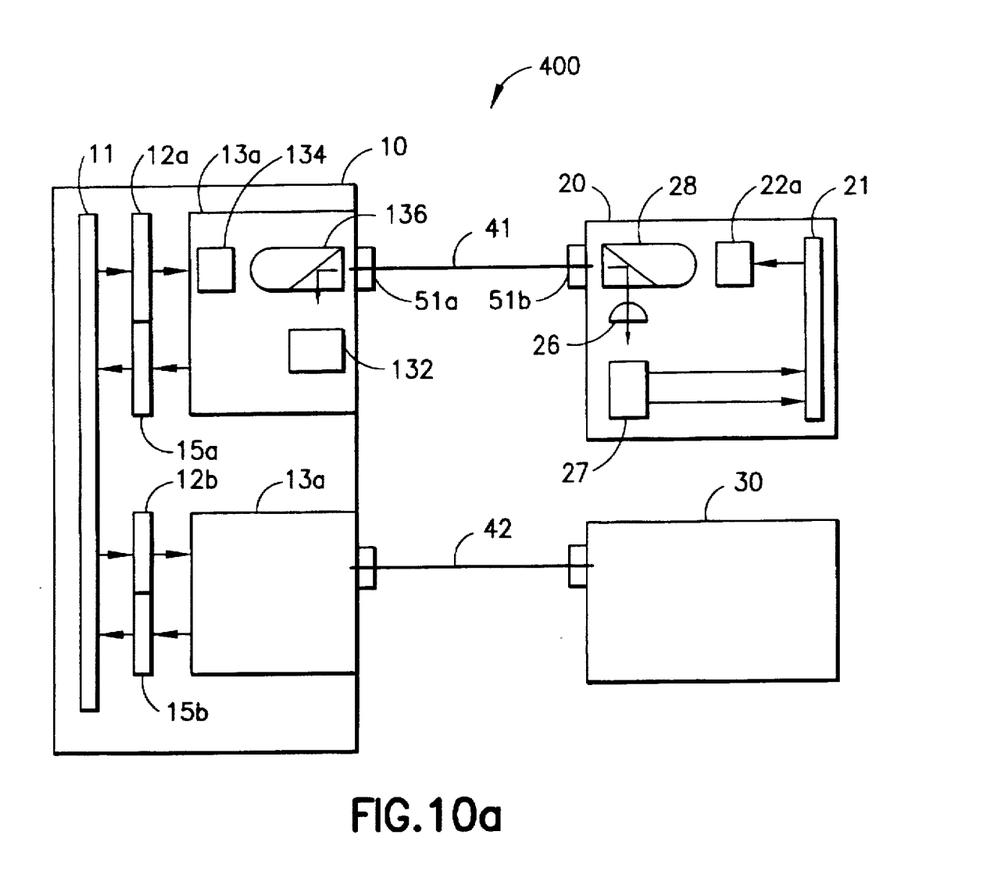
FIG. 10a shows a block diagram of an optically powered signal transmission apparatus according to a fourth embodiment of the present invention.

Referring to FIG. 10a, an optically powered signal transmission apparatus, shown generally at 400, includes control station 10. This embodiment is a modification of the foregoing embodiments, based on the second embodiment. Optically powered signal transmission apparatus 400 has a structure for reducing electric power consumption in control station 10.

Figure 10B:
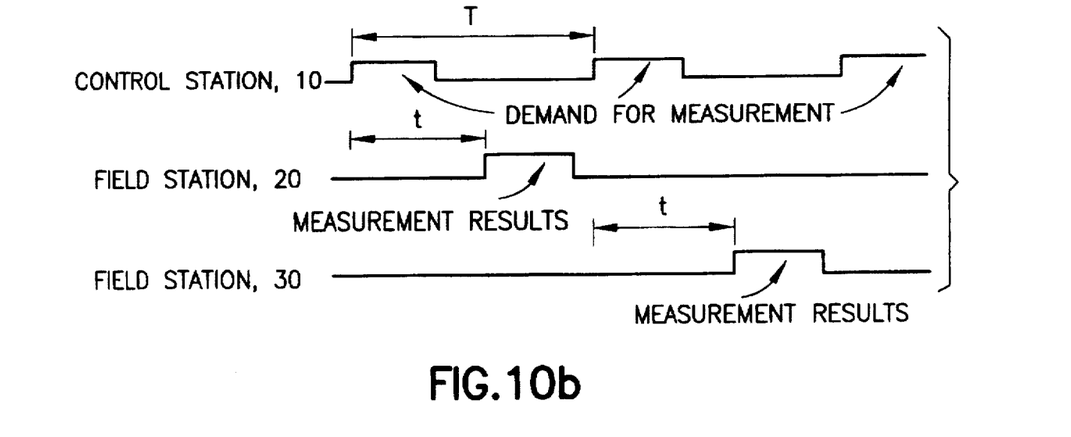
FIG. 10b shows a timing diagram for a control station and field stations according to the fourth embodiment of the present invention.

Referring to FIG. 10b, control station 10 periodically (period: T) sends a control signal to field stations 20, 30 to renew their measurement data. Field stations 20, 30 send new data to control station 10 after a response time t elapses from when field stations 20, 30 receive the control signal from control station 10.

Referring again to FIG. 10a, field station 20 is equipped with a timer means 15a. Also, field station 30 is equipped with a timer means 15b. Timer means 15a, 15b are used to reduce electric power consumption when optical fiber 41 has not yet been connected (when field station 30 is not used) or when connector 51a, 51b is disengaged. Timer means 15a, 15b prevent long term radiation of light to the air. Timer means 15a, 15b, for example, monitor the response time t and stop the feeding of power light when the response time t exceeds a predetermined time period (as shown in FIG. 10b).

In the present invention, battery 25 (as shown in Prior Art FIG. 11) is eliminated from the bidirectional optical transmission system by optically powering field station 20 with light supplied from control station 10. Thus, the present invention reduces maintenance costs of an optical bidirectional transmission system and further facilitates bidirectional communication through the optical fiber between two optical transmission stations.

In the present invention, control and field stations 10, 20 are provided with respective light sources for emitting signal light beams. By this configuration, the signal transmission length, or, the distance between control and field stations 10, 20, is more than twice as long as in the conventional bidirectional signal transmission apparatus.

According to the present invention, control station 10 monitors the response time of field stations 20, 30 and stops feeding power light when the response time exceeds a predetermined time. Thus, power consumption in control station 10 is reduced.

Although the present invention uses an optical fiber to provide a transmission path between the control station and the field station, the present invention is not limited to this arrangement. It is within the contemplation of the present invention that the optical transmission be through air, or through any combination of gases and solids that are sufficiently transparent to pass enough signal and power light components to produce the electric signal and electric power.

Furthermore, optical fiber is not an essential part of the invention. Any suitable optical transmission path, such as air or liquid, may also be used.

Having described preferred embodiments of the present invention with reference to the accompanying drawings, it is to be understood that the present invention is not limited to the precise embodiments, and that various changes and modifications may be effected therein by one skilled in the art without departing from the scope or spirit of the present invention which is limited only by the appended claims.

What is claimed is:

1. A bidirectional optically powered signal transmission apparatus, comprising:

first and second optical transmission stations;

first means, in said first optical transmission station, for sending a first signal light beam over a first optical transmission path to said second optical transmission station;

second means, in said first optical transmission station, for receiving a second signal light beam sent over said first optical transmission path from said second optical transmission station;

third means, in said second optical transmission station, for sending said second signal light beam to said first optical transmission station over said first optical transmission path;

fourth means, in said second optical transmission station, for receiving said first signal light beam sent from said first optical transmission station;

fifth means, in said first optical transmission station, for sending a power light beam to said second optical transmission station over a second optical transmission path, distinct from said first optical transmission path;

sixth means, in said second optical transmission station, for receiving said power light beam sent from said first optical transmission station and for converting said power light beam to electric power for powering said second optical transmission station; and said first and second signal light beams having different wavelengths.

2. A bidirectional optically powered signal transmission apparatus, comprising:

first and second optical transmission stations;

first means, in said first optical transmission station, for sending a first light beam over an optical transmission path to said second optical transmission station;

second means, in said first optical transmission station, for receiving a second light beam sent from said second optical transmission station;

said first light beam including an AC signal component superimposed on a DC power component;

third means, in said second optical transmission station, for sending said second light beam to said first optical transmission station over said optical transmission path;

fourth means, in said second optical transmission station, for receiving said first light beam sent from said first optical transmission station;

fifth means, in said second optical transmission station, for converting said DC power component to an electric power for powering said second optical transmission station and for converting said AC signal component to a first electric signal for controlling said second optical transmission station;

said first means including first light source means for radiating said first light beam of a first predetermined wavelength, and driving means for regulating said AC component;

said third means including second light source means for radiating said second light beam of a second predetermined wavelength; and said second predetermined wavelength being different from said first predetermined wavelength.

3. The apparatus according to claim 2, wherein said fifth means includes:
   a first opto-electric converter for converting said DC power component to said electric power, said first opto-electric converter including a plurality of light receivers arranged in an array; and
   a second opto-electric converter for converting said AC signal component to said first electric signal, said second opto-electric converter including a light receiver.

4. The apparatus according to claim 3, wherein said plurality of light receivers of said first opto-electric converter and said light receiver of said second opto-electric converter are integrally formed as a compound semiconductor light receiver film.

5. The apparatus according to claim 2, wherein said second means includes:
   a first light splitter-coupler for receiving said second light beam sent from said second optical transmission station; and
   a first light receiver for converting said second light beam received from said first light splitter-coupler to a second electric signal.

6. The apparatus according to claim 5, wherein said first light splitter-coupler includes:
   a first positive lens for coupling said first light beam to said optical transmission path;
   a wavelength selection filter; and
   said wavelength selection filter being selective for said second predetermined wavelength.

7. The apparatus according to claim 2, wherein said fourth means includes:
   a second light splitter-coupler for directing said first light beam received from said first optical transmission station to said fifth means.

8. The apparatus according to claim 7, wherein said second light splitter-coupler includes:
   a second positive lens for coupling said second light beam to said optical transmission path;
   a wavelength selection filter; and
   said wavelength selection filter being selective for said first predetermined wavelength.

9. The apparatus according to claim 2, further comprising:
   means for sending a command signal to said second optical transmission station;
   means for monitoring a time from said sending of said command signal to arrival of a response signal from said second optical transmission station; and
   means for stopping sending of said first light beam from said first optical transmission station when a predetermined time period has elapsed before said arrival of said response signal.

10. A bidirectional optically powered signal transmission apparatus, comprising:
    first and second optical transmission stations;
    first means, in said first optical transmission station, for sending a first light beam on an optical transmission path to said second optical transmission station;
    second means, in said first optical transmission station, for receiving a second light beam sent from said second optical transmission station;
    said first light beam including a signal light and a power light;
    third means, in said second optical transmission station, for sending said second light beam to said first optical transmission station over said optical transmission path;
    fourth means, in said second optical transmission station, for receiving said first light beam sent from said first optical transmission station;
    fifth means, in said second optical transmission station, for converting said power light to an electric power for powering said second optical transmission station and for converting said signal light to a first electric signal for controlling said second optical transmission station;
    said first means including first light source means for radiating said first light beam of a first predetermined wavelength and driving means for modulating an intensity of said power light at a first predetermined period and for modulating an intensity of said signal light at a second predetermined period, said second predetermined period being shorter than said first predetermined period;
    said third means including second light source means for radiating said second light beam of a second predetermined wavelength; and
    said second predetermined wavelength being different from said first predetermined wavelength.

11. The apparatus according to claim 10, wherein said fifth means includes:
    a first opto-electric converter for converting said power light from said first optical transmission station to said electric power; and
    a second opto-electric converter for converting said signal light from said first optical transmission station to said first electric signal.

12. The apparatus according to claim 11, wherein said fifth means further includes:
    a transformer for boosting an output voltage of said first opto-electric converter; and
    a rectifier for converting an AC output of said transformer to a DC electric power.

13. The apparatus according to claim 11, wherein a photosensitive area of said first opto-electric converter is wider than a photosensitive area of said second opto-electric converter.

14. The apparatus according to claim 11, wherein said first opto-electric converter and said second opto-electric converter are integrally formed as a compound semiconductor opto-electric converter film.

15. The apparatus according to claim 10, wherein said second means includes:
    a first light splitter-coupler for receiving said second light beam sent from said second optical transmission station; and
    a first light receiver for converting said second light beam received from said first light splitter-coupler to a second electric signal.

16. The apparatus according to claim 15, wherein said first light splitter-coupler includes:
    a first positive lens for coupling said first light beam to said optical transmission path;
    a wavelength selection filter; and
    said wavelength selection filter being selective for said second predetermined wavelength.

17. The apparatus according to claim 10, wherein said fourth means includes:
    a second light splitter-coupler for directing said first light beam sent from said first optical transmission station to said fifth means.

18. The apparatus according to claim 17, wherein said second light splitter-coupler includes:

a second positive lens for coupling said second light beam to said optical transmission path;

a wavelength selection filter; and said wavelength selection filter being selective for said first predetermined wavelength.

19. The apparatus according to claim 10, further comprising:

means for sending a command signal to said second optical transmission station;

means for monitoring a time from said sending of said command signal to arrival of a response signal to said first optical transmission station; and means for stopping sending of said power light from said first optical transmission station when a predetermined time period has elapsed before said arrival of said response signal.

20. A bidirectional optically powered signal transmission apparatus, comprising:

a control station;

a field station;

means in said control station for sending a first light beam of a first predetermined wavelength on an optical transmission path to said field station;

said first light beam including an AC signal light component and a DC power light component;

an intensity of said DC power light component being modulated at a first predetermined period and an intensity of said AC signal light component being modulated at a second predetermined period, said second predetermined period being shorter than said first predetermined period;

means in said control station for receiving a second light beam sent from said field station;

means in said field station for sending said second light beam at a second predetermined wavelength to said control station over said optical transmission path;

means in said field station for receiving said AC signal light component and said DC power light component sent from said control station;

means in said field station for converting said DC power light component to an electric power for powering said field station and for converting said AC signal light component to a control signal for controlling said field station; and said second predetermined wavelength being different from said first predetermined wavelength.

\* \* \* \* \*